(12) United States Patent
Verma (10) Patent No.: US 9,499,291 B2
(45) Date of Patent: Nov. 22, 2016

(54) HOLD-OPEN DEVICE AND PACKAGE HAVING SAME

(71) Applicant: Vishaal Boehm Verma, Evanston, IL (US)

(72) Inventor: Vishaal Boehm Verma, Evanston, IL (US)

(73) Assignee: ProAmpac Intermediate, Inc., Cincinnati, OH (US)

( * ) Notice: Subject to any disclaimer, the term of this patent is extended or adjusted under 35 U.S.C. 154(b) by 0 days.

(21) Appl. No.: 14/259,868

(22) Filed: Apr. 23, 2014

(65) Prior Publication Data

US 2014/0314342 A1    Oct. 23, 2014

Related U.S. Application Data (60) Provisional application No. 61/815,252, filed on Apr. 23, 2013.

(51) Int. Cl.
*B65B 67/00* (2006.01)
*B65B 67/12* (2006.01)

(52) U.S. Cl.
CPC .................... *B65B 67/1255* (2013.01)

(58) Field of Classification Search
CPC .... B65D 33/007; B65D 33/16; B65D 33/30; B65D 33/1658; B65D 33/02; B65B 67/1255; B65B 61/188; B65F 1/0006
USPC ...................................... 383/33, 34
See application file for complete search history.

(56) References Cited

U.S. PATENT DOCUMENTS

| | | |
|---|---|---|
| 199,507 A | 1/1878 | Brubaker |
| 1,463,113 A | 7/1923 | Bibb |
| 1,887,940 A | 11/1932 | Marinsky |
| 2,008,314 A | 7/1935 | Russell |
| 2,040,271 A | 5/1936 | Rozenweig |
| 2,074,843 A | 5/1937 | Hiering |
| 2,142,904 A | 1/1939 | Lamarthe |
| 2,150,627 A | 3/1939 | Lieber |
| 2,693,212 A | 11/1954 | Guichard |

(Continued)

FOREIGN PATENT DOCUMENTS

| | | |
|---|---|---|
| EP | 2112085 A1 | 10/2009 |
| GB | 189726598 A | 11/1898 |

(Continued)

OTHER PUBLICATIONS

International Search Report and Written Opinion of the International Searching Authority, received for International Patent Application No. PCT/US2012/068314, mailed Mar. 14, 2013 (6 pages).

(Continued)

*Primary Examiner* — Peter Helvey
(74) *Attorney, Agent, or Firm* — Perman & Green, LLP (57) ABSTRACT

A device for selectively retaining a package opening in a gaping configuration and a package including the device applied to a package body. The device includes a circumferential strip with side seams formed as hinges. One or more tabs extend in a first axial direction from an upper edge of the circumferential strip at the side seams. Each tab is coupled to the circumferential strip with a hinge. The tabs are pivotable about the hinges in opposite directions away from the opening axis to respective folded-out positions, which inhibits the device from folding at the side seams and retains a gaping open configuration of the device and package.

24 Claims, 6 Drawing Sheets

(56) References Cited

U.S. PATENT DOCUMENTS

| | | | |
|---|---|---|---|
| 3,310,224 A * | 3/1967 | Laguerre | 383/15 |
| 3,313,469 A | 4/1967 | Drozda | |
| 4,069,994 A | 1/1978 | Wharmby | |
| 4,486,923 A | 12/1984 | Briggs | |
| 4,664,348 A | 5/1987 | Corsaut, III et al. | |
| 4,753,367 A | 6/1988 | Miller et al. | |
| 4,753,489 A | 6/1988 | Mochizuki | |
| 4,758,099 A | 7/1988 | Branson | |
| 4,815,866 A | 3/1989 | Martone | |
| 4,848,930 A * | 7/1989 | Williams et al. | 383/104 |
| 5,035,518 A | 7/1991 | McClintock | |
| 5,037,138 A | 8/1991 | McClintock et al. | |
| 5,044,774 A | 9/1991 | Bullard et al. | |
| 5,082,219 A | 1/1992 | Blair | |
| 5,183,227 A | 2/1993 | Wilhite | |
| 5,184,896 A | 2/1993 | Hammond et al. | |
| 5,524,990 A | 6/1996 | Buck | |
| 5,609,419 A | 3/1997 | Byers, Jr. | |
| 5,676,306 A | 10/1997 | Lankin et al. | |
| 5,716,138 A | 2/1998 | Southwell | |
| 6,022,144 A | 2/2000 | Hausslein | |
| 6,149,304 A | 11/2000 | Hamilton et al. | |
| 6,164,821 A | 12/2000 | Randall | |
| 6,231,235 B1 | 5/2001 | Galomb et al. | |
| 6,234,674 B1 | 5/2001 | Byers, Jr. | |
| 6,234,676 B1 | 5/2001 | Galomb et al. | |
| 6,273,608 B1 | 8/2001 | Ward et al. | |
| 6,345,911 B1 | 2/2002 | Young et al. | |
| 6,508,587 B1 | 1/2003 | Byers, Jr. | |
| 6,572,267 B1 | 6/2003 | Forman | |
| 6,578,585 B1 | 6/2003 | Stachowski et al. | |
| 6,678,923 B2 | 1/2004 | Goldberg | |
| 6,899,460 B2 | 5/2005 | Turvey et al. | |
| 6,904,647 B2 | 6/2005 | Byers, Jr. | |
| 7,347,623 B2 * | 3/2008 | Cawley | 383/33 |
| 7,416,337 B2 * | 8/2008 | Munch-Fals | 383/34 |
| 7,681,784 B2 | 3/2010 | Lang | |
| 8,333,351 B2 | 12/2012 | Kramer | |
| 8,678,650 B2 * | 3/2014 | Savage | 383/33 |
| 2003/0033694 A1 | 2/2003 | Cisek | |
| 2004/0195467 A1 | 10/2004 | Passage | |
| 2004/0208400 A1 | 10/2004 | Linneweil | |
| 2005/0137073 A1 | 6/2005 | Weaver | |
| 2005/0281487 A1 | 12/2005 | Pawloski | |
| 2006/0010659 A1 | 1/2006 | Penn | |
| 2006/0050999 A1 * | 3/2006 | Blythe et al. | 383/63 |
| 2006/0280386 A1 | 12/2006 | Bublitz | |
| 2008/0019618 A1 | 1/2008 | Dayton et al. | |
| 2009/0046955 A1 | 2/2009 | Schember et al. | |
| 2011/0188785 A1 | 8/2011 | Turvey et al. | |
| 2011/0226914 A1 | 9/2011 | Fleming | |
| 2012/0138623 A1 | 6/2012 | Verma | |
| 2013/0064480 A1 | 3/2013 | Verma | |
| 2013/0248541 A1 | 9/2013 | Verma | |
| 2014/0014789 A1 | 1/2014 | Verma | |
| 2014/0259868 A1 | 4/2014 | Verma | |

FOREIGN PATENT DOCUMENTS

| | | |
|---|---|---|
| JP | 51-017122 U | 2/1976 |
| JP | 2000-085905 A | 3/2000 |
| JP | 2003-072779 A | 3/2003 |
| WO | 99/00312 A1 | 1/1999 |

OTHER PUBLICATIONS

International Search Report and Written Opinion of the International Searching Authority, received for International Patent Application No. PCT/US2011/062840, mailed Apr. 23, 2012 (6 pages).

U.S. Patent and Trademark Office Non-final Office Action, received for U.S. Appl. No. 12/958,217, mailed Nov. 6, 2012 (7 pages).

U.S. Patent and Trademark Office Final Office Action, received for U.S. Appl. No. 12/958,217, mailed Apr. 12, 2013 (10 pages).

U.S. Patent and Trademark Office Non-final Office Action, received for U.S. Appl. No. 13/485,773, mailed Nov. 3, 2014 (12 pages).

Impact Advanced Concepts, "Snap Span" earliest available publication Apr. 8, 2012 at https://web.archive.org/web/20120408231153/http://www.snap-span.com/ downloaded Apr. 29, 2014 (2 pages).

Jokari Baggy Rack, "Baggy Rack Pro" earliest available publication Nov. 15, 2012 at https://web.archive.org/web/20121115010901/http://www.jokari.com/products/G_169606.html downloaded Apr. 29, 2014 (1 page).

Office Action from the U.S. Appl. No. 13/786,068 dated Apr. 13, 2015 (26 pages).

International Search Report and Written Opinion of the International Searching Authority, received for International Patent Application No. PCT/US2014/035154, mailed Aug. 29, 2014 (12 pages).

* cited by examiner

HOLD-OPEN DEVICE AND PACKAGE HAVING SAME

CROSS-REFERENCE TO RELATED APPLICATIONS

This application claims priority to U.S. Provisional Patent Application No. 61/815,252, filed Apr. 23, 2013, the entire contents of which are incorporated by reference herein.

BACKGROUND

The present invention relates to containers, such as flexible packages with re-sealable openings, and furthermore, to devices for holding such packages open.

Pliable containers are widely used to store both edible and non-edible products. For example, snack items, such as various types of chips and cereals, are typically packaged in pliable containers. These containers are generally sealed at both ends for initial packaging purposes and then one end is opened to access the product. Although flexible enough to allow the open end to assume a gaping open configuration, generally from a flat closed configuration, such containers may spring back to a closed or mostly-closed configuration when not held open. This may be especially true where the container is a package constructed of flexible sides coupled together at a pair of longitudinal side seams. Such packages often include zip-type closures for creating a reusable air tight seal at the open end of the package or container. Although these configurations often make repeated opening and closing of the package simple and convenient, the flexible nature of both the package and zip-type closure make it difficult to maintain the package in an open configuration such that the side walls of the package are widely separated making it easy to access withheld contents.

SUMMARY

In one aspect, the invention provides a device for selectively retaining a package opening in a gaping configuration. A circumferential strip is configured to be secured to a package opening, the circumferential strip defining an opening axis. A pair of side seams are formed as hinges. The pair of side seams define opposed first and second ends of the device, and the device is divided by the pair of side seams into first and second sides. A pair of tabs extend in a first axial direction from an upper edge of the circumferential strip, with one of the pair of tabs being positioned at each of the opposed first and second ends of the device. Each one of the pair of tabs is coupled to the circumferential strip with a hinge. The pair of tabs are pivotable about the hinges in opposite directions away from the opening axis to respective folded-out positions. Each one of the pair of side seams intersects a corresponding one of the hinges of the pair of tabs such that folding of the device at the side seams inhibits pivoting of the pair of tabs to the respective folded-out positions, and folding of the device at the side seams is inhibited to retain a gaping open configuration of the device when the pair of tabs are in the respective folded-out positions.

In another aspect, the invention provides a package including a package body having flexible sides, a closed end, an openable end, and a pair of side seams, and a device for selectively retaining the openable end of the package body in a gaping configuration. The device includes a circumferential strip secured to the package body at the openable end. The circumferential strip defines an opening axis coaxial with a package body axis. A pair of side seams are aligned with the pair of side seams of the package body, and the pair of side seams are formed by hinges. A pair of tabs extend in a first axial direction from an upper edge of the circumferential strip. One of the pair of tabs extends across each one of the side seams of the device. Each one of the pair of tabs is coupled to the circumferential strip with a hinge. The pair of tabs are pivotable in opposite directions away from the opening axis about the hinges to respective folded-out positions. Each one of the pair of side seams intersects a corresponding one of the hinges of the pair of tabs such that folding of the device at the side seams inhibits pivoting of the pair of tabs to the respective folded-out positions, and folding of the device at the side seams is inhibited to retain a gaping open configuration of the device when the pair of tabs are in the respective folded-out positions. As such, the package is operable in at least two configurations including: a first configuration in which the device is folded upon its side seams and the openable end of the package body can be closed, and a second configuration in which the pair of tabs are both folded outward away from the opening axis about the respective hinges to inhibit closing of the openable end of the package body.

In one aspect, the invention provides a device for selectively retaining a package opening in a gaping configuration, the device includes a strip portion configured to be secured to a package opening, and at least one tab extending from the strip portion. A longitudinal hinge portion divides the strip portion and the tab into two sides and allows the two sides to be folded together about the longitudinal hinge portion. A transverse hinge portion couples the tab to the strip portion and intersects the longitudinal hinge portion, allowing the tab to pivot from a longitudinal orientation generally aligned with the strip portion to a folded-out position that is angled out of alignment from the strip portion. Folding of the device along the longitudinal hinge inhibits pivoting of the tab to the folded-out position, and folding of the device along the longitudinal hinge is inhibited when the tab is in the folded-out position.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

FIGS. 1-6 illustrate a device 20 which can hold open a package. While the hold-open device 20 can maintain a package opening in a gaping configuration as described in further detail below, the device 20 also allows the package opening to be closed without significant resistance and without removing the device 20 from the package. Although shown as part of a package in additional drawings and described below, the structure of the hold-open device 20 is first described with reference to FIGS. 1-6.

Figure 1:
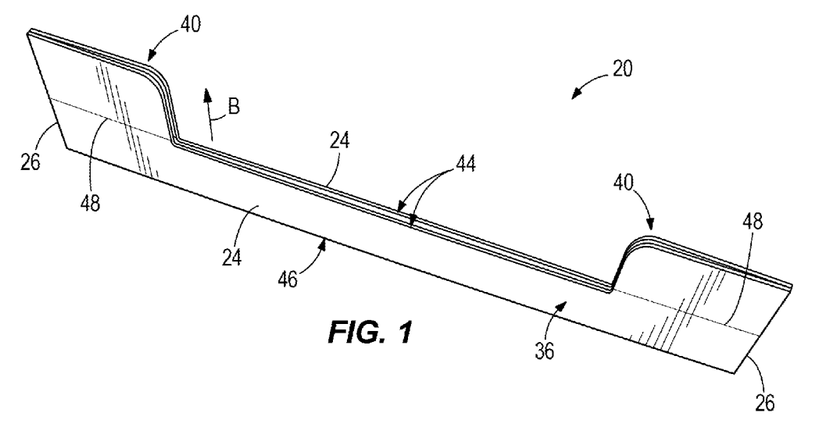
FIG. 1 is a perspective view of a hold-open device according to one construction, shown in a closed configuration.
Figure 2:
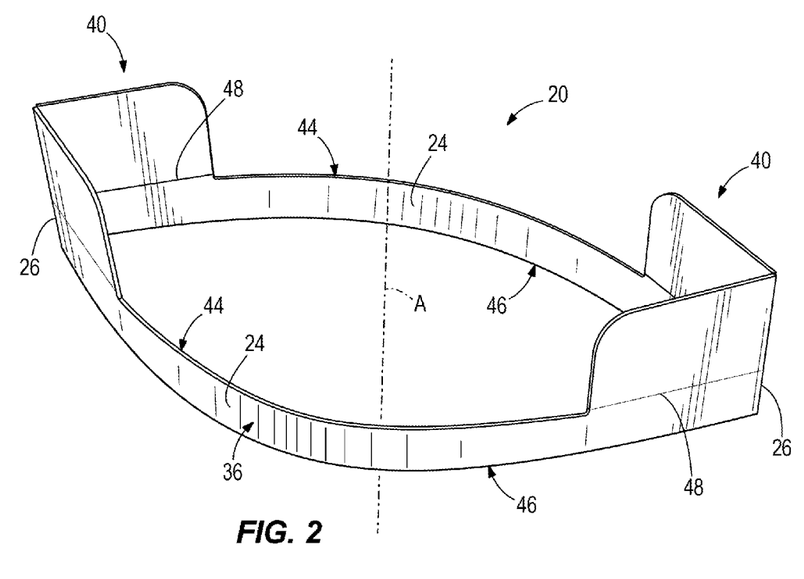
FIG. 2 is a perspective view of the hold-open device of FIG. 1, shown in an intermediate open configuration.
Figure 3A:
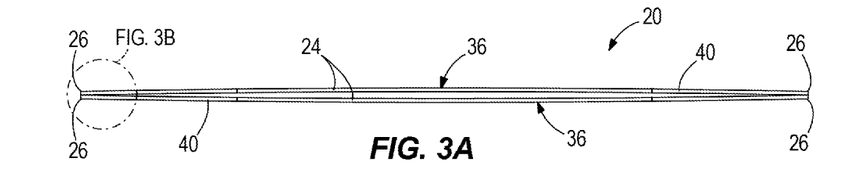
FIG. 3A is a top view of the hold-open device of FIG. 1, shown in the closed configuration.
Figure 3B:
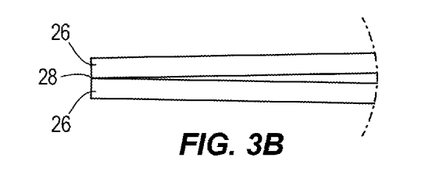
FIG. 3B is a detail view of an end portion of the hold-open device as shown in FIG. 3A.
Figure 4A:
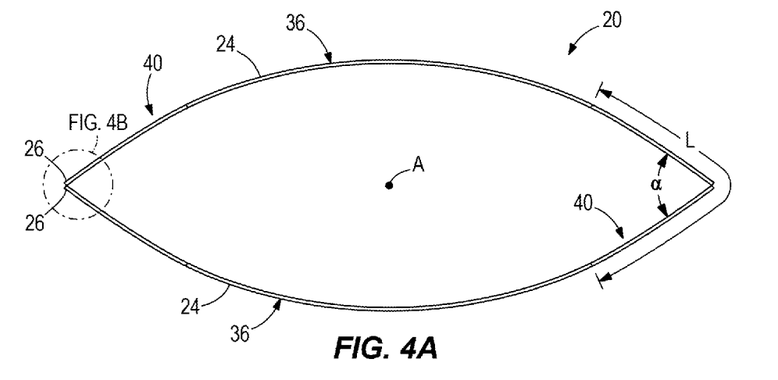
FIG. 4A is a top view of the hold-open device of FIG. 1, shown in the intermediate open configuration and illustrating living hinge connections.
Figure 4B:
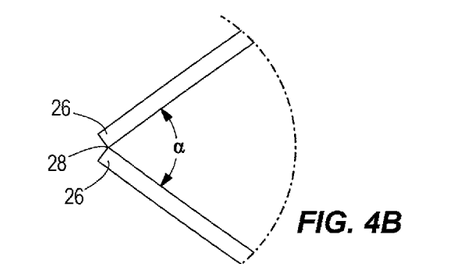
FIG. 4B is a detail view of an end portion of the hold-open device as shown in FIG. 4A.

The hold-open device 20 includes a circumferential strip provided by two side portions 24 coupled together at their ends 26 by two hinge portions 28. The side portions 24 can be of substantially equal length such that the hinge portions 28 are positioned at two opposing ends of the device 20. The hinge portions 28 are configured to allow the two side portions 24 to lie directly against one another along their entire length to define a closed configuration as shown in FIGS. 1 and 3A. An opening angle α between the two side portions 24, as defined in FIGS. 4A and 4B, may be approximately 0 degrees when in the closed configuration. The hinge portions 28 also allow the two side portions 24 to be separated, with each of the side portions 24 assuming (i.e., flexing into) a generally arcuate shape as shown in FIGS. 2, 4A, and 4B. The hinge portions 28 may enable the device 20 to be opened to any opening angle α above 0 degrees up to about 180 degrees. In this way, the hinge portions 28 define side seams that extend parallel to a central axis A of the device 20 defined, when open, as shown in FIG. 2. While orientation is not critical, this may be referred to as the vertical or longitudinal direction for convenience. Although the central axis A may not be the center of the arc or curvature of either of the side portions 24, which themselves may have multiple different arc portions, the central axis A is defined as the point midway across a virtual line that extends between the two ends 26.

The two side portions 24 forming the circumferential strip is constructed from a flexible material. In some constructions, the construction includes integrally molding as a ring from a flexible thermoplastic polymer material. In other constructions, the circumferential strip may be formed by bonding together (e.g., via a heat seal, solvent weld, etc.) two opposing ends of a finite length or strip of material cut from a continuous tape feed. For example, such a bond 32 can be formed at an intermediate position of one of the side portions 24 as shown in the alternate constructions of FIGS. 10 and 11. Whether molded or bonded into ring form, the two side portions 24 and the hinge portions 28 can be made of polyolefin material, including for example, polypropylene, polyethylene, or any blend thereof. Although the device 20 can be entirely or primarily formed of polyolefin material, additional fillers and/or plasticizers are optionally added. As described in further detail below, the circumferential strip can be secured or fixed to a package body (e.g., adjacent an opening thereof) to selectively control the configuration of the opening. The circumferential strip is provided with a radially outward facing surface 36 on both of the side portions 24 for securement with a package body. As best shown in FIG. 4B, the hinge portions 28 connecting the two side portions 24 are formed as blind slits in the radially outward side to separate or interrupt the radially exterior surfaces 36. In other words, the hinge portions 28 are positioned at or adjacent a radially innermost side of the side portions 24. The hinge portions 28 may form a continuous radially inner surface between the adjacent side portions 24. When provided as living hinges, the hinge portions 28 can be integrally formed as a single piece with both of the adjacent side portions 24, as a reduced-thickness portion of the material. The hinge portions 28 can be formed by a slitting operation performed after molding in some constructions. Alternately, the hinge portions 28 can be formed by die cutting, or directly in an injection molding process, or laser engraving, among other possible techniques. The hinge portions 28 can have a material thickness less than 50 percent of a material thickness of the adjacent portions of the circumferential strip. In some constructions, the hinge portions 28 can have a material thickness that is 10 percent or less of a material thickness of the adjacent portions of the circumferential strip. The material thickness of the hinge portions 28 can be between about 0.010 inch and about 0.020 inch (e.g., about 0.254 mm to about 0.508 mm) in some constructions. In some constructions, the hinge portions 28 are provided by a separate material and/or multi-piece hinge mechanism coupled between the side portions 24. However, the hinge portions 28 may be provided as any portion that enables folding, bending, or pivoting. For example, the hinge portions 28 may be provided by only a fold or crease in the material.

Where the ends 26 of the side portions 24 meet at each of the side seams, the device 20 further includes a tab 40 that extends from the circumferential strip (i.e., from an upper edge 44 of the circumferential strip). The tabs 40 are thus positioned at opposite ends of the device 20 as shown in the drawings, and both extend from the circumferential strip in a common first direction B, which is substantially parallel to the central axis A when the device 20 is in the closed or partially open configurations of FIGS. 1-4B. The first direction B can define an upward or outward direction that extends opposite a base end 46 of the circumferential strip, which is configured to be positioned furthest into a package opening. As described in further detail below, most or all of each tab 40 may extend outwardly past the end of a package when secured thereto. The tabs 40 are positioned so that each spans across a corresponding one of the side seams. Although other constructions may be optional, each of the tabs 40 has a length L in the circumferential direction which is centered about the respective side seam. The lengths L of the two tabs 40 combined can make up a minority portion of the total circumference of the device 20. In some constructions, the combined lengths L of the two tabs 40 can make up between about 15 percent and about 40 percent of the total circumference of the device 20. It should also be noted that the side seams defined by the hinge portions 28 extend fully along the respective tabs 40 in the axial direction. The structure of the hinge portions 28 in the area of the tabs 40 can be identical to that described above. In this way, the tabs 40 fold along the side seams together with the circumferential strip.

Figure 6:
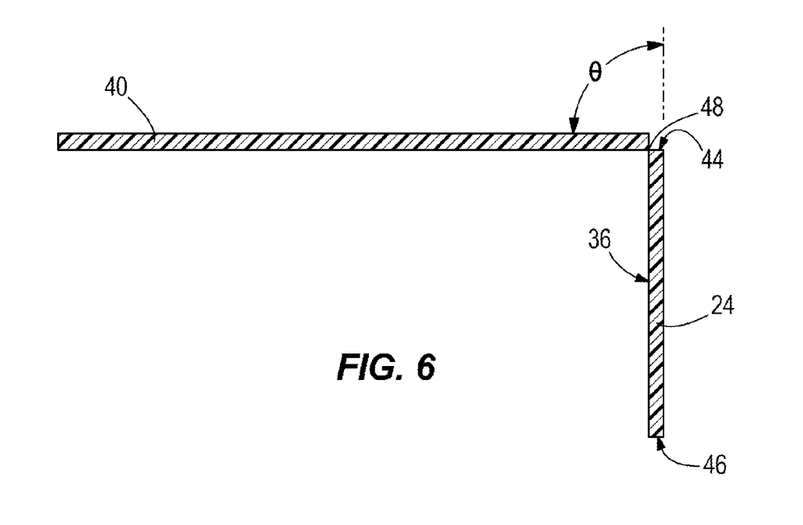
FIG. 6 is a cross-sectional view of a portion of the hold-open device, taken along line 6-6 of FIG. 5, to illustrate a living hinge connection of one of the tabs.

Each of the tabs 40 is coupled to the circumferential strip (i.e., the adjoining end sections of both of the side portions 24) with a respective hinge portion 48. The hinge portions 48 can extend along a generally circumferential direction, transverse to the central axis A, although the length of each is only equal to that of the tab 40. In some constructions, the hinge portions 48 are living hinges. As best shown in FIG. 6, the hinge portions 48 can be formed by blind slits in the radially inward side to separate or interrupt the radially interior surface of the device 20 between the circumferential strip and tab portions. In other words, the hinge portions 48 are positioned at or adjacent a radially outermost side of the tabs 40 and the side portions 24. Each hinge portion 48 may form a continuous radially outer surface amongst the respective tab 40 and the adjacent side portions 24. When the hinge portions 48 are provided as living hinges, the tabs 40 can be integrally formed as a single piece with the circumferential strip (i.e., with both of the adjacent side portions 24), as a reduced-thickness portion of the material according to the materials and processes described above. The hinge portions 48 can be formed by a slitting operation performed after molding in some constructions. Alternately, the hinge portions 48 can be formed by die cutting, or directly in an injection molding process, or laser engraving, among other possible techniques. The hinge portions 48 can have a material thickness less than 50 percent of a material thickness of the adjacent tab 40 and the adjacent portion of the circumferential strip. In some constructions, the hinge portions 48 can have a material thickness that is 10 percent or less of a material thickness of the adjacent tab 40 and the adjacent portion of the circumferential strip. The material thickness of the hinge portions 48 can be between about 0.254 mm and about 0.508 mm (e.g., about 0.010 inch to about 0.020 inch) in some constructions. In some constructions, the hinge portions 48 are provided by a separate material and/or multi-piece hinge mechanism coupled between the circumferential strip and each tab 40. However, the hinge portions 48 may be provided as any portion that enables folding, bending, or pivoting. For example, the hinge portions 48 may be provided by only a fold or crease in the material.

Figure 5:
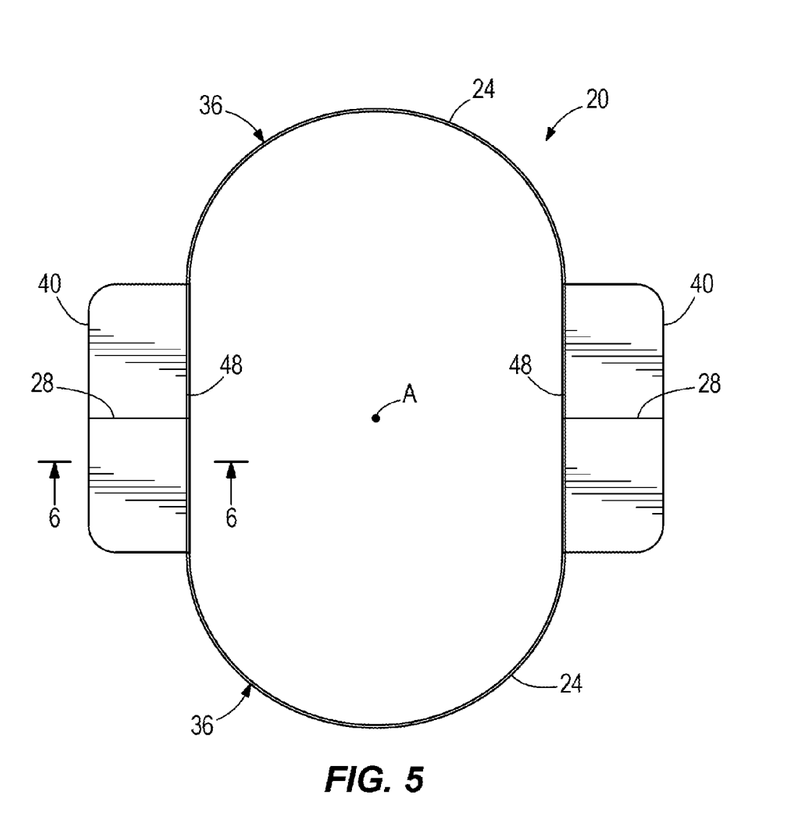
FIG. 5 is a top view of the hold-open device of FIG. 1, shown locked in a fully-open or gaping configuration by a pair of opposed end tabs that are folded outward.
Figure 7:
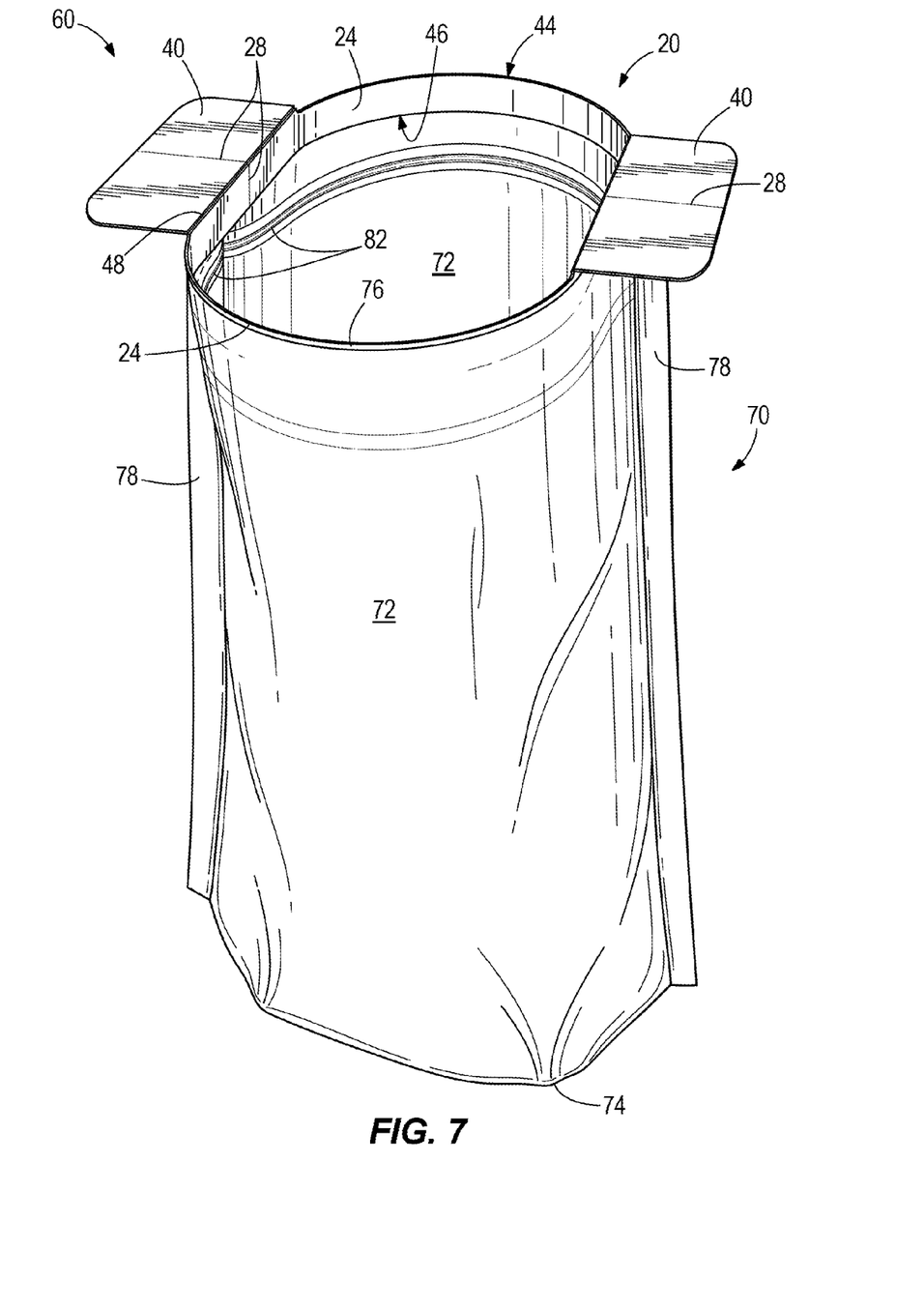
FIG. 7 is a perspective view of a package including the hold-open device of FIGS. 1-6 mounted in an opening of the package body.

The tabs 40 are foldable or pivotable in opposite directions away from the central axis A about their respective hinge portions 48 to respective folded-out positions, as shown in FIGS. 5-7. The hinge portions 48 can enable the folding of each tab 40 relative to the circumferential strip about an opening angle θ as defined in FIG. 6. The tabs 40 can fold from an extended or unfolded position (i.e., an opening angle θ of about 0 degrees) to a fully folded position (i.e., an opening angle θ of about 90 degrees). In some constructions, the hinge portions 48 may physically enable folding of the tabs 40 to more or less than 90 degree opening angles, but 90 degrees defines the point of maximum outward extension, and is thus referenced as "fully" folded. In general, a folded position may be defined as reaching an opening angle θ of greater than 45 degrees or greater than 60 degrees. As will be appreciated by the following description, the purpose of folding the tabs 40 to an outward position is to effectively inhibit or prevent folding of the circumferential strip at the side seams toward the closed configuration.

The hinge portions 48 delineating the tabs 40 intersect the hinge portions 28 that define the side seams. As shown, the respective hinge portions 28, 48 intersect at substantially 90 degree angles (e.g., perpendicular). Due to the intersection and the configuration of the hinge portions 28, 48, the device can either be folded closed about the side seams (i.e., hinge portions 28) or the tabs 40 can be folded out about the hinge portions 48, but not both at the same time as the folding out of the tabs 40 upsets the continuity or linearity of the side seam hinge portions 28 enough to prevent folding of the device about the side seams. In effect, the folding of the tabs 40 forces the side seams into a straight configuration where ends of the two side portions 24 combine to form a substantially flat or straight line section. Meanwhile, the portions of the circumferential strip that are not in overlapping arrangement with the tabs 40 are free to flex and assume a curved or arcuate shape as shown in FIGS. 5 and 7. Although the exact shape of the device 20 in the fully open configuration is at least somewhat variable as desired, it is generally formed by two opposed flat sections in the area of the side seams, connected by two opposed arcuate portions. The shape of the device 20 in the fully open configuration can approach circular as the length of the flat sections is reduced. Even when the device 20 does not open into a circular shape, it defines a wide-open or gaping configuration in which the cross-sectional area is very large, and near a maximum possible cross-sectional area for a given perimeter length. For example, the cross-sectional area of the opening defined by the device 20 in the fully open configuration may be at least 75 percent of the maximum possible cross-sectional area for a given perimeter length.

To produce a package 60 as shown in FIG. 7, the device 20 can be secured to a package body 70 having flexible sides 72, a closed end 74, an openable end 76, and a pair of side seams 78. The package 60 can be a multi-configurational package, which has at least one stable wide-open configuration provided by the device 20 (e.g., in the configuration of FIG. 5 as shown), in addition to one or more configurations in which the openable end 76 is not held wide-open by the device 20. The package body 70 can be constructed from a thin film or sheet of thermoplastic polymer, but other materials may also be used. All or a portion of the circumferential strip may be positioned along the interior surface of the package body 70, such that all or majority portions of the tabs 40 protrude outside the end 76 of the package body 70 to facilitate folding. The device 20 can be secured to the package body 70 in any number of suitable ways such as adhesively bonded, heat sealed, solvent or chemical welding. Such securing may be deemed permanent securement, which is intended for the life of the package 60.

The package body 70 can be provided with a resealable closure 82 (e.g., a pressure type zip closure, a slide type zip closure, etc.) to seal in the contents of the package 60 away from the surrounding environment. Other types of closures 82 are optional, and in some constructions, the package 60 can be provided with a closure that is not resealable or no closure at all. As shown in FIG. 7, the resealable closure 82 is positioned proximate the openable end 76, with the device 20 situated therebetween. The device 20 is arranged in the package body 70 such that the side seams of the device 20, as defined by the hinge portions 28, are substantially aligned with the side seams 78, so that the device 20 is capable of folding closed or flat along with the package body 70. When the resealable closure 82 is released, the device 20 can optionally be manipulated to hold the openable end 76 in a gaping configuration that provides easy access into the interior of the package 60.

In a first configuration, the package 60 is in a closable state in which the hinge portions 28 of the device 20 are folded. In this configuration, the resealable closure 82 may be manipulated to a closed state and the device 20 does not interfere with closing or sealing of the package 60. Folding along the hinge portions 28 substantially prevents the hinge portions 48 of the tabs 40 from being folded outward as they are folded upon themselves. In a second configuration, the package 60 is held open by the device 20, with the tabs 40 being folded outwardly along the respective hinge portions 28 to substantially prevent folding along the hinge portions 28. In this configuration, the tabs 40 themselves are in a generally flat, unfolded state (i.e., not folded on themselves about the hinge portions 28). To put the device 20 and the package 60 into the second configuration, the tabs 40 are simply grasped and folded outward. From a closed or nearly-closed configuration, the side seams will first be brought toward one another to enable folding the tabs 40 outward. From the second configuration, the user folds the tabs 40 back toward the first direction B, whereby the device 20 can then fold along the side seam hinge portions 28.

Figure 8:
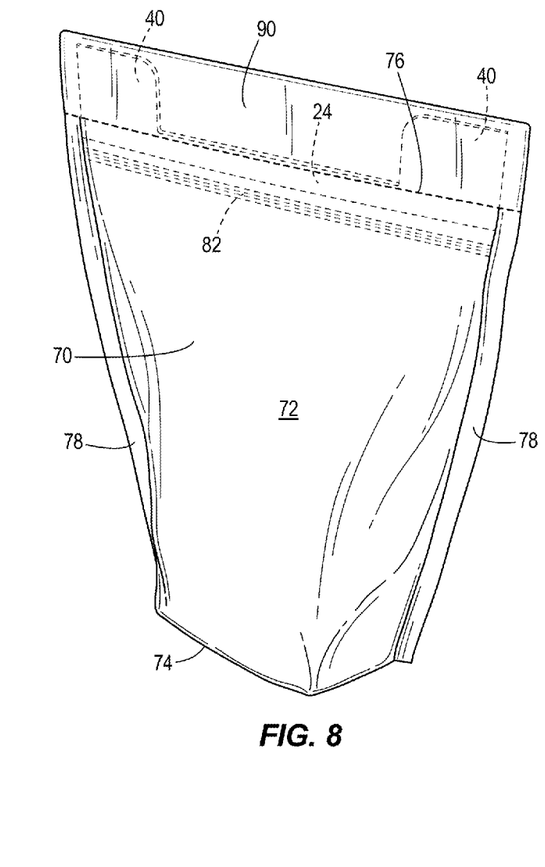
FIG. 8 is a perspective view of a package including the hold-open device of FIGS. 1-6 and provided with a hermetically-sealed header strip for a store shelf configuration prior to initial use.
Figure 9:
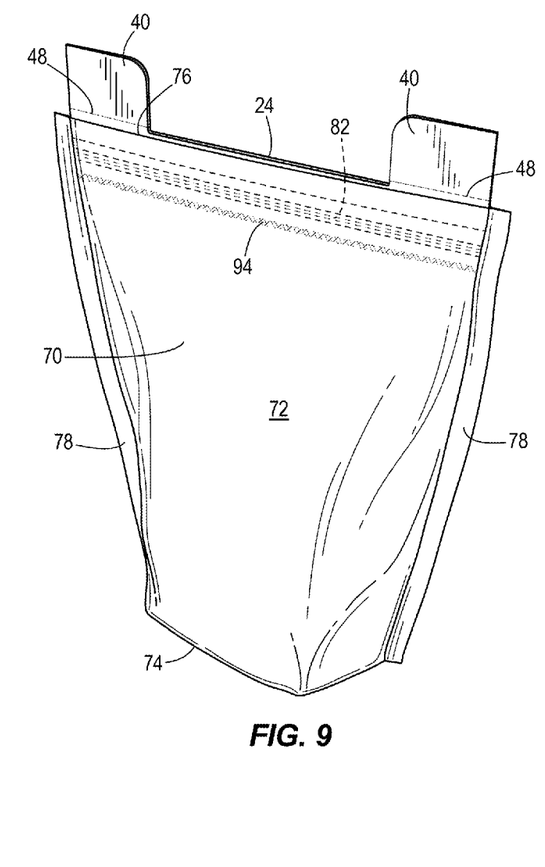
FIG. 9 is a perspective view of the package of FIG. 8, shown with the header strip removed to expose the tabs of the hold-open device.

FIG. 8 illustrates the package 60 in a "store shelf" configuration prior to initial use. In other words, this configuration may be the final manufactured configuration of the package 60, including its designated contents, which have not been accessed by a consumer or end user. As such, the package 60 includes a header 90 that provides an air-tight or hermetic seal regardless of the status of the resealable closure 82. The header 90 can be formed as an integral portion of the package body 70, and can be easily removed via tearing (e.g., along a predetermined line of weakening, such as by scoring or partial perforations). The header 90 can enclose the device 20, including the tabs 40. Upon removal of the header 90, the tabs 40 are accessible, and the user can operate the resealable closure 82 and the device 20 as described above. In an alternate construction shown in FIG. 9, an air-tight or hermetic seal can be provided without the use of a header 90. Rather, a seal 94 is provided directly between the opposing flexible sides 72 of the package body 70, just below (i.e., to the interior side of) the device 20 and the resealable closure 82.

Figure 10:
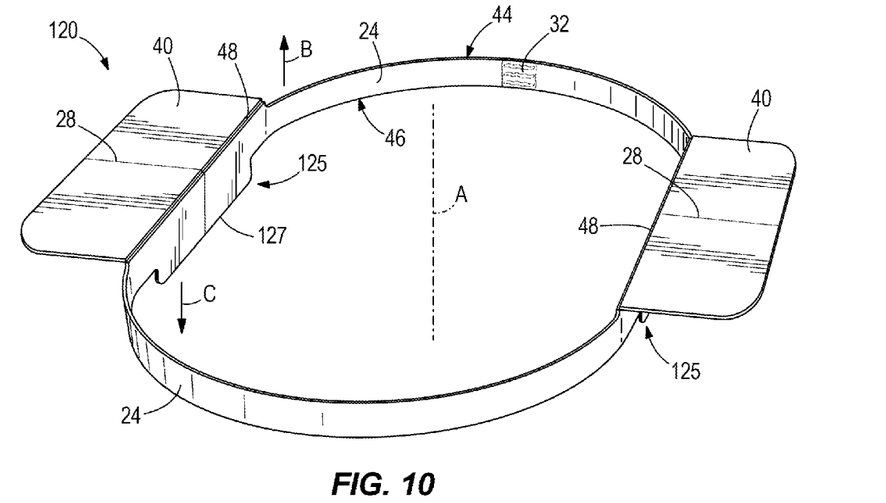
FIG. 10 is a perspective view of a hold-open device according to another construction.

FIG. 10 illustrates a device 120 according to an alternate construction. The device 120 is similar to the device 20 of FIGS. 1-9, except as specifically described. In addition to the tabs 40, which extend from the circumferential strip in the first direction B parallel to the central axis A (when the device 120 is folded about the side seams), the device 120 includes at least one projection 125 substantially aligned with one of the tabs 40 and extending from the circumferential strip in a second direction C opposite the first direction B. In some constructions, a projection 125 is positioned in alignment with each of the tabs 40. The projections 125 can have a circumferential dimension similar to that of the tabs 40. Each projection 125 includes a substantially flat lower edge 127. When the device 120 is secured to a package body, the flat lower edge 127 of the projection 125 is positioned generally within the interior of the package, and this allows a user to run a measuring scoop along the edge 127 to obtain a consistent measure of a substance stored within the package (e.g., coffee grounds, flour, sugar, etc.).

Figure 11:
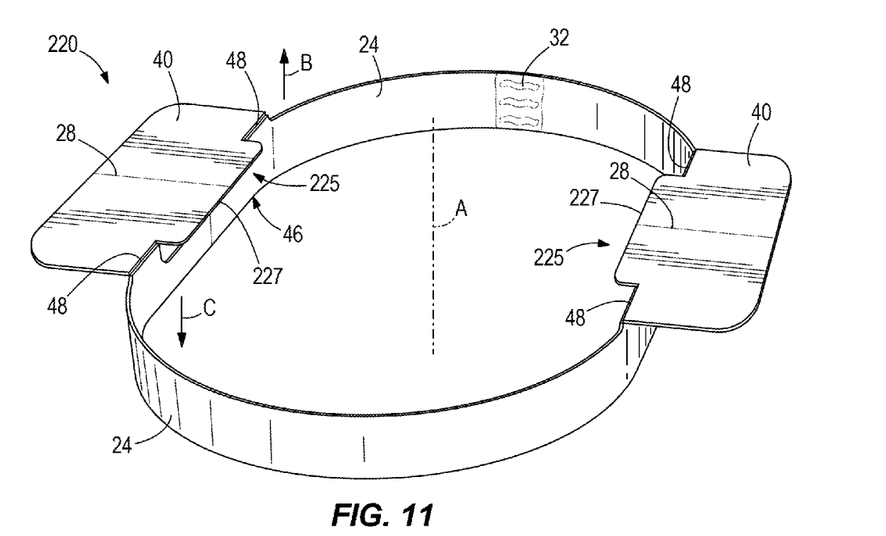
FIG. 11 is a perspective view of a hold-open device according to yet another construction.

FIG. 11 illustrates a device 220 according to another alternate construction. The device 220 is similar to the device 120 of FIG. 10, except as specifically described. The device 220 includes at least one projection 225 providing a substantially flat lower edge 227. When the device 220 is secured to a package body, the flat lower edge 227 of the projection 225 is positioned generally within the interior of the package, and this allows a user to run a measuring scoop along the edge 227 to obtain a consistent measure of a substance stored within the package (e.g., coffee grounds, flour, sugar, etc.) similar to the device 120 of FIG. 10. However, in the device 220, the projections 225 are integrally formed to extend directly from the tabs 40. The projections 225 are thus positioned above the base end 46 of the circumferential strip, but are able to extend into the interior of the package by way of having free ends separated (e.g., cut) from the circumferential strip. In this way, the projections 225 move directly with the tabs 40, and may pivot between a retracted or non-operable position (not shown) and an extended operable position as shown. The projections 225 only extend in the direction C when the tabs 40 are upright and not folded out about the hinge portions 48. The tabs 40 formed with the projections 225 as shown in FIG. 11 causes the hinge portion 48 for each individual tab 40 to be divided into two separate segments.

Although not shown, any of the devices described herein and shown in the drawings may be modified with more or fewer side seams and tabs. For example, a device may be constructed that is identical to any of the illustrated devices with the exception of the removal of one of the tabs and the hinge portion coupling that tab. Although the stable hold-open configuration may then not have a shape as shown in FIG. 5, the interaction between the remaining tab and the side seam intersecting that tab is similar to that described above in such a construction, to selectively enable and inhibit folding of the device (and likewise a package connected thereto) at the side seam. It is also noted that the devices as otherwise described above may be provided with a non-circumferential strip portion coupled to each individual tab as opposed to the circumferential strip as shown. For example, a strip portion may be provided below each tab, but not extending to connect with the strip portion associated with an opposing tab. The strip portion can extend along the package opening with a length similar to the connected tab, or slightly more or less. In this way, one or more devices may be separately secured to a flexible package body proximate (e.g., extending across) one or more corresponding side seams of the package body. Even a single-tab device applied at one package crease or seam can be operated to selectively maintain the opening in a gaping configuration, as it will inhibit folding of the opening at that seam.

The devices 20, 120, 220 described herein may be used in conjunction with any variety of closure mechanisms and packaging formats including sachet and stand-up style pouches, for example. Each of the devices 20, 120, 220 can be manufactured as a fitment where each unit is applied to a package body (e.g., a pre-formed package body) as part of an assembly process or as a tape where the mechanisms are applied in conjunction with horizontal form fill seal (HFFS) or vertical form fill seal (VFFS) machinery used to form, fill and seal flexible packages.

What is claimed is:
1. A device for selectively retaining a package opening in a gaping configuration, the device comprising:
   a single circumferential strip formed from a finite length or strip of material having opposing ends configured to be secured to a package opening, the circumferential strip defining an opening axis;
   a pair of side seams formed as hinges, wherein the pair of side seams define opposed first and second ends of the device, the device being divided by the pair of side seams into first and second sides; and a pair of tabs extending in a first axial direction from an upper edge of the circumferential strip, one of the pair of tabs being positioned at each of the opposed first and second ends of the device, each one of the pair of tabs being coupled to the circumferential strip with a hinge, the pair of tabs being pivotable about the hinges in opposite directions away from the opening axis to respective folded-out positions, wherein each one of the pair of side seams intersects a corresponding one of the hinges of the pair of tabs such that folding of the device at the side seams inhibits pivoting of the pair of tabs to the respective folded-out positions, and folding of the device at the side seams is inhibited to retain a gaping open configuration of the device when the pair of tabs are in the respective folded-out positions, wherein each of the pair of side seams is a living hinge located at a radially inward side of the device and formed by a blind slit in a die cutting process from a radially outward side of the device, and wherein the hinges of each of the pair of tabs is a living hinge located at a radially outward side of the device and formed by a blind slit in a die cutting process from a radially inward side of the device, and further comprising a bond provided in the circumferential strip at an intermediate location along one of the first and second sides, spaced from both of the pair of side seams, wherein the bond joins opposing ends of the circumferential strip, and wherein the living hinge of each of the pair of side seams has a material thickness that is 10 percent or less of adjacent portions of the circumferential strip, and wherein the living hinge of each of the pair of tabs has a material thickness that is 10 percent or less of adjacent portions of the circumferential strip and the corresponding one of the pair of tabs.

2. The device of claim 1, wherein the pair of side seams extend substantially parallel to the opening axis and extend along a full axial length of the device, from upper ends of the pair of tabs to a lower end of the circumferential strip, and wherein the hinges of the pair of tabs extend substantially circumferentially and substantially perpendicular to the opening axis.

3. The device of claim 1, further comprising at least one projection substantially aligned with one of the pair of tabs in the circumferential direction and extending in a direction opposite the first axial direction.

4. A package comprising:
a package body including flexible sides, a closed end, an openable end, and a pair of side seams; and
a device for selectively retaining the openable end of the package body in a gaping configuration, the device including
a single circumferential strip formed from a finite length or strip of material having opposing ends secured to the package body at the openable end, the circumferential strip defining an opening axis coaxial with a package body axis,
a pair of side seams aligned with the pair of side seams of the package body, the pair of side seams of the device being formed by hinges, and
a pair of tabs extending in a first axial direction from an upper edge of the circumferential strip, one of the pair of tabs extending across each one of the side seams of the device, each one of the pair of tabs being coupled to the circumferential strip with a hinge, the pair of tabs being pivotable in opposite directions away from the opening axis about the hinges to respective folded-out positions, wherein each of the pair of side seams is a living hinge located at a radially inward side of the device and formed by a blind slit in a die cutting process from a radially outward side of the device, and wherein the hinges of each of the pair of tabs is a living hinge located at a radially outward side of the device and formed by a blind slit in a die cutting process from a radially inward side of the device; and wherein the pair of side seams divide the device into first and second sides, the device further comprising a bond provided in the circumferential strip at an intermediate location along one of the first and second sides, spaced from both of the pair of side seams, wherein the bond joins opposing ends of the circumferential strip, and wherein the living hinge of each of the pair of side seams has a material thickness that is 10 percent or less of adjacent portions of the circumferential strip, and wherein the living hinge of each of the pair of tabs has a material thickness that is 10 percent or less of adjacent portions of the circumferential strip and the corresponding one of the pair of tabs;

wherein each one of the pair of side seams of the device intersects a corresponding one of the hinges of the pair of tabs such that folding of the device at its side seams inhibits pivoting of the pair of tabs to the respective folded-out positions, and folding of the device at its side seams is inhibited to retain a gaping open configuration of the device when the pair of tabs are in the respective folded-out positions, the package thus being operable in at least two configurations including a first configuration in which the device is folded upon its side seam and the openable end of the package body can be closed, and a second configuration in which the pair of tabs are both folded outward away from the opening axis about the respective hinges to inhibit closing of the openable end of the package body.

5. The package of claim 4, further comprising a resealable closure mechanism for selectively holding the openable end of the package closed.

6. The package of claim 5, wherein the resealable closure mechanism is positioned proximate the openable end with the circumferential strip positioned therebetween.

7. The package of claim 4, wherein the pair of tabs extend outwardly past the openable end of the package body in the first configuration.

8. The package of claim 7, further comprising a hermetically-sealed header coupled to the package body at the openable end, the header covering the pair of tabs and being severable from the package body to expose the pair of tabs and enable access to the package body through the openable end.

9. The package of claim 4, wherein the hinges of the pair of tabs extend substantially circumferentially and substantially perpendicular to the opening axis and the package body axis, and wherein the pair of side seams extend along a full axial length of the device, from upper ends of the pair of tabs to a lower end of the circumferential strip.

10. The package of claim 4, further comprising at least one projection substantially aligned with one of the pair of tabs in the circumferential direction and extending in an inward direction into the package body.

11. The package of claim 4, further comprising a hermetic seal formed between the flexible sides of the package body, the hermetic seal being positioned adjacent the openable end, with the circumferential strip positioned therebetween.

12. The package of claim 11, further comprising a resealable closure mechanism operable to selectively hold the openable end of the package closed.

13. A device for selectively retaining a package opening in a gaping configuration, the device comprising:
- a single strip portion formed from a finite length or strip of material having opposing ends configured to be secured to a package opening;
- at least one tab extending from the strip portion;
- a longitudinal hinge portion dividing the strip portion and the tab into two sides, the longitudinal hinge portion allowing the two sides to be folded together about the longitudinal hinge portion, wherein the longitudinal hinge portion is a living hinge located at a radially inward side of the device and formed by a blind slit in a die cutting process from a radially outward side of the device; and
- a transverse hinge portion coupling the tab to the strip portion, the transverse hinge intersecting the longitudinal hinge portion and allowing the tab to pivot from a longitudinal orientation generally aligned with the strip portion to a folded-out position that is angled out of alignment from the strip portion, wherein the transverse hinge portion is a living hinge located at a radially outward side of the device and formed by a blind slit in a die cutting process from a radially inward side of the device, and
- further comprising a bond provided in the strip portion at an intermediate location along one of the two sides, spaced from the longitudinal hinge portion, wherein the bond joins opposing ends of the strip portion, and
- wherein the living hinge forming the longitudinal hinge portion has a material thickness that is 10 percent or less of adjacent portions of the strip portion, and wherein the living hinge forming the transverse hinge portion has a material thickness that is 10 percent or less of adjacent portions of the strip portion and the tab, and
- wherein folding of the device along the longitudinal hinge inhibits pivoting of the tab to the folded-out position, and folding of the device along the longitudinal hinge is inhibited when the tab is in the folded-out position.

14. The device of claim 13, and a package coupled thereto, the package having at least one openable end, which is secured to the strip portion of the device.

15. The device of claim 1, wherein each of the hinges of the pair of tabs is formed as two separate hinge segments.

16. The package of claim 4, wherein each of the hinges of the pair of tabs is formed as two separate hinge segments.

17. The package of claim 12, wherein the resealable closure mechanism is provided in the package body, spaced from the device.

18. The device of claim 13 further comprising at least one projection substantially aligned with the at least one tab in the circumferential direction and extending in a direction opposite the at least one tab when the at least one tab is generally aligned with the strip portion in the longitudinal orientation.

19. The device of claim 3, wherein the least one projection substantially aligned with one of the pair of tabs is integrally formed from the one of the pair of tabs.

20. The package of claim 10, wherein the at least one projection substantially aligned with one of the pair of tabs is integrally formed from the one of the pair of tabs.

21. The device of claim 18, wherein the at least one projection substantially aligned with the at least one tab is integrally formed from the at least one tab.

22. The device of claim 1, wherein the angle between the pair of side seams and the pair of tabs is about 90 degrees when the pair of tabs are in the respective folded-out positions.

23. The package of claim 4, wherein the angle between the pair of side seams and the pair of tabs is about 90 degrees when the pair of tabs are in the respective folded-out positions.

24. The device of claim 13, wherein the angle between the longitudinal hinge portion and the at least one tab is about 90 degrees when the at least one tab is in the folded-out position.

* * * * *